(12) United States Patent
Howard

(10) Patent No.: US 6,679,611 B2
(45) Date of Patent: Jan. 20, 2004

(54) ADAPTIVE, ALUMINIZED MYLAR MIRROR

(75) Inventor: Robert J. Howard, Clifton, VA (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 10/279,066

(22) Filed: Oct. 24, 2002

(65) Prior Publication Data

US 2003/0231413 A1 Dec. 18, 2003

Related U.S. Application Data

(60) Provisional application No. 60/388,291, filed on Jun. 14, 2002.

(51) Int. Cl.[7] .............................................. G02B 7/182
(52) U.S. Cl. .................... 359/846; 359/845; 359/847
(58) Field of Search ................ 359/846, 845, 359/847, 848, 849, 878

(56) References Cited

U.S. PATENT DOCUMENTS

| | | | |
|---|---|---|---|
| 3,581,304 A | * | 5/1971 | Paradise et al. ............ 341/156 |
| 3,623,796 A | | 11/1971 | Schweiger |
| 3,893,755 A | | 7/1975 | Cobarg et al. |
| 4,243,315 A | | 1/1981 | Wolf |
| 5,438,416 A | | 8/1995 | Nater |
| 5,612,736 A | * | 3/1997 | Vogeley et al. ......... 348/207.99 |
| 5,798,878 A | * | 8/1998 | Asari et al. .................. 359/846 |
| 5,980,049 A | * | 11/1999 | Blackmon, Jr. ............. 359/858 |
| 6,300,937 B1 | | 10/2001 | Rosenberg |
| 6,358,021 B1 | | 3/2002 | Cabuz |
| 6,393,884 B1 | | 5/2002 | Berntsson et al. |
| 6,408,135 B1 | | 6/2002 | Imada |
| 6,547,406 B1 | * | 4/2003 | Greenaway et al. ......... 359/846 |
| 6,552,318 B1 | * | 4/2003 | Crowther et al. ......... 250/201.9 |

* cited by examiner

Primary Examiner—Mohammad Sikder
(74) Attorney, Agent, or Firm—Mark A. Wurm

(57) ABSTRACT

An infrared beam is directed to the surface of a Mylar mirror, and the mirror reflects that beam. The reflected beam is detected, and data gleaned from the reflected beam is used to determine whether the optics of the mirror must be adjusted. The optics of the mirror are adjusted by varying voltage applied to electrostatic actuators on the frame of the mirror, or varying the pressure in chambers formed by the mirror frame and mirror surface.

14 Claims, 2 Drawing Sheets

ADAPTIVE, ALUMINIZED MYLAR MIRROR

CROSS-REFERENCE TO RELATED APPLICATION

This application claims the benefit of U.S. Provisional Application Serial No. 60/388,291 filed Jun. 14, 2002, and which is incorporated herein by reference.

FIELD OF THE INVENTION

The present invention relates to optics and to the use of electrostatic and pneumatic actuators to correct the optics of mirrors, and in particular, thin filmed plastic mirrors such as Mylar mirrors.

BACKGROUND

Curved, aluminized Mylar mirrors are light weight and have found important applications in visual trainer systems. They have also been proposed and investigated for applications such as large, space-based telescopes where cost and weight are critical considerations. The methods proposed and utilized to date, to manufacture these mirrors depend upon stretching the Mylar over a pre-formed frame and drawing it into shape with a vacuum and/or air pressure. This however, typically leads to a certain amount of uncontrolled distortion. The problem is worse for space-based applications, where creases in the mirror due to packing are creating even more difficulties.

Attempts to solve this problem in the past have been limited to controlling the shape of the frame and the Mylar drawing schedule. A need therefore exists for an improved system to maintain and adjust the optics of a Mylar mirror.

SUMMARY OF THE INVENTION

The present invention involves the use of electrostatic and/or pneumatic actuators to correct the optics of Mylar mirrors, such as those used in visual trainer systems. The invention could also be implemented on thin filmed plastic mirrors other than Mylar, or glass or quartz mirrors.

A Mylar mirror is manufactured from a frame and a Mylar reflecting surface. An infrared generating source directs a laser or other infrared beam towards the mirror surface. The mirror surface reflects the laser, and the reflected beam is detected by an infrared sensor. An analog/digital conversion and processor unit analyses the reflected beam, calculations are performed with results converted to analog format and amplified. The electric potential is transmitted to electrodes which are attached to the frame of the mirror. The electric potential supplied to the electrodes, in conjunction with an electric potential supplied to the mirror surface, causes the Mylar reflecting surface to move, thereby adjusting the optics of the mirror. This process occurs on a segment by segment (of the mirror) basis, and is controlled by the analog/digital conversion and processor unit.

In another embodiment of the invention, chambers on the mirror are formed by the boundaries of the mirror frame, the Mylar mirror surface, and foam coffer dams disposed between the frame and mirror surface. A control valve connects each chamber to a vacuum source and/or a pressurized air source. By controlling a vacuum on the chamber, or supplying pressurized air to the chamber, the mirror surface which forms a boundary of that particular chamber moves towards the frame or away from the frame respectively, thereby adjusting the optics of the mirror.

Accordingly, it is an object of the present invention to provide a system and method to automatically and continuously adjust the optics of a mirror, and in particular, a thin filmed plastic mirror such as a Mylar mirror.

It is another object of the present invention to automatically and continuously adjust the optics of a thin filmed plastic mirror through the use of a processor-controlled infrared generating source.

It is a further object of the present invention to automatically and continuously adjust the optics of a thin filmed plastic mirror through the use of electrostatic actuators.

It is a still further object of the present invention to automatically and continuously adjust the optics of a thin filmed plastic mirror through the use of pneumatic actuators.

Briefly, these and other objects are satisfied by the invention disclosed in the following drawings and detailed description.

DETAILED DESCRIPTION

Figure 1:
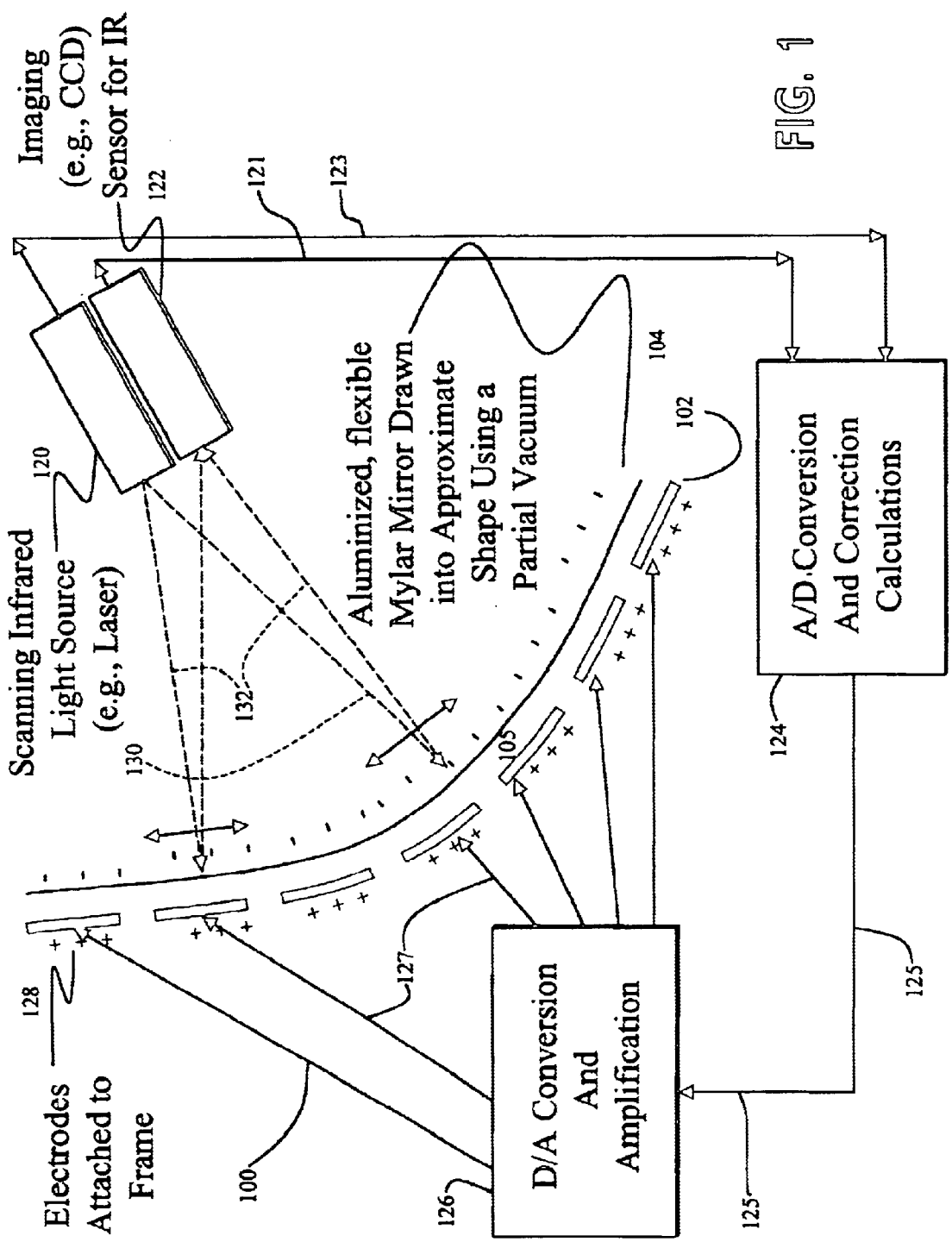
FIG. 1 is a depiction of an adaptive aluminized Mylar mirror of the present invention which utilizes electrodes to adjust the optics of the mirror.

A preferred embodiment of the invention is illustrated in FIG. 1. The invention will be described as it relates to a Mylar mirror, but mirror compositions such as other thin filmed plastic mirrors, and quartz and glass mirrors are also encompassed by the invention.

FIG. 1 illustrates an adaptive aluminized Mylar mirror 100. The mirror is manufactured using a frame 102, and an aluminized flexible Mylar mirror 104. The Mylar mirror is placed onto and pulled over the frame 102, forming a chamber 105 between the frame 102 and the Mylar mirror 104. The Mylar mirror 104 is then drawn into shape over the frame 102 by pulling a vacuum on the chamber 105. The mirror system 100 of the present invention further contains a scanning infrared light source 120, for example, a laser, and an infrared imaging sensor 122, for example a charged coupled device (CCD). Both the scanning infrared light source 120 and the infrared imaging sensor 122 are connected via wires 121 and 123 to an analog/digital conversion and processor unit 124. The analog/digital conversion and processor unit 124 is connected via wire 125 to a digital/analog conversion and amplification unit 126. The digital/analog conversion and amplification unit 126 is connected via wires 127 to an array of electrodes 128 which are attached to the mirror frame 102.

Figure 2:
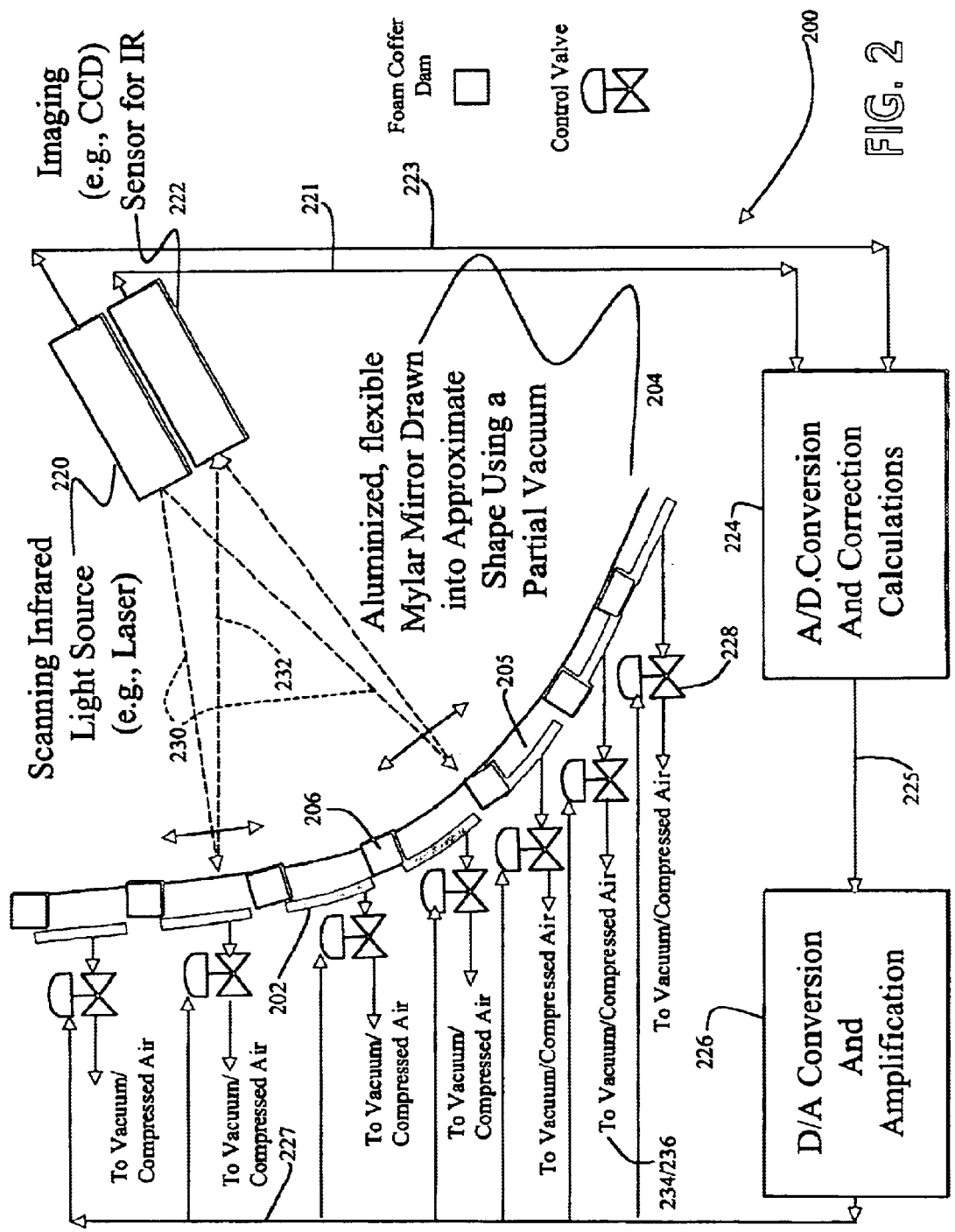
FIG. 2 is a depiction of an adaptive aluminized Mylar mirror of the present invention which utilizes a vacuum pulled in, or pressure applied, to chambers between the mirror frame and the mirror surface to adjust the position of the Mylar mirror surface and thereby the optics of the Mylar mirror.

Another embodiment of the adaptive aluminized Mylar mirror of the present invention is illustrated in FIG. 2.

The mirror system 200 of FIG. 2 is made up of a mirror frame 202 and an aluminized flexible Mylar mirror 204. Disposed between the mirror frame 202 and the Mylar mirror 204 are one or more foam coffer dams 206. The mirror frame 202, Mylar surface 204, and coffer dams 206 form multiple chambers 205. The mirror system 200 further contains a scanning infrared light source 220 and an infrared imaging sensor 222. The scanning infrared light source 220 could be a laser, and the infrared imaging sensor 222 could be a charged coupled device (CCD). The Infrared light source 220 and infrared imaging sensor 222 are connected via wires 221 and 223 to an analog/digital conversion and processor unit 224. Processor unit 224 is coupled via wire 225 to a digital/analog conversion and amplification unit 226. The digital/analog conversion and amplification unit 226 is connected via wires 227 to one or more control valves 228. The control valves 228 connect the chambers 205 with a vacuum pump 234 and/or a source of pressurized air 236.

Referring again to FIG. 1, the mirror system 100 functions as follows. The infrared light source 120 emits an infrared beam 130, e.g. a laser, directed towards a particular segment of the aluminized surface of the Mylar mirror 104. The Mylar mirror 104 reflects the laser beam 130, and the reflected beam 132 is detected by the infrared imaging sensor 122.

If there are no deformities on the surface of the segment of the Mylar mirror surface 104, the individual waves which make up the reflected beam 132 will be parallel. Therefore, detection of parallel waves by the infrared imaging sensor 122 indicates that no correction will be required. However, if the surface of the Mylar mirror 104 contains one or more deformities, the waves which make up the reflected beam 132 will not be parallel, and correction will be required.

There are several means known to those skilled in the art to determine the nature and position of infrared waves which are reflected off a surface such as a mirror. In one method, the infrared imaging sensor 122 contains a lenselet array (a collection of small identical lenses) which focus the incoming reflected beams 132 on a square grid within the infrared imaging sensor 122. If the waves of the reflected beam 132 are parallel, the waves will be focused at the center of each square which forms the grid (or some predetermined position in the squares). This indicates a "clean" reflection off the surface of the mirror, i.e. no deformities, and no correction of the mirror is required.

However, if the waves which make up the reflected beam 132 entering the infrared imaging sensor 122 are not parallel, the lenses will not be able to focus the non-parallel waves onto the centers of the squares of the grid. The displacement of the waves in the orthogonal x–y directions on the grid is proportional to the slopes of the irregular wave front formed by these non-parallel waves. Utilizing least squares and/or electronic feedback techniques, these slopes can be made to approach zero, translating into a parallel wave front. Therefore the waves of the reflected beam become closely parallel. To implement this, a voltage is calculated and transmitted to the digital/analog conversion and amplification unit 126. The voltage causes movement of and a consequent change in the shape of that segment of the Mylar mirror 104. Another reading is then taken by the infrared imaging sensor 122 to determine if the reflected waves 132 are now parallel, or at least more closely parallel (indicated by waves which are focused closer to the grid center than were the waves of the previous iteration). This process is repeated until that segment of the Mylar mirror 104 produces a reflected beam 132 comprised substantially of parallel waves.

Another way to determine the composition of the reflected beam 132 is through the use of a Point Spread Function (PSF). Briefly, if there are deformities in the surface of the Mylar mirror 104, the waves of the reflected beam will not be parallel. This will result in some waves of the reflected beam 132 missing the expected point of impact on the infrared imaging sensor 122, or even entirely missing the infrared imaging sensor 132 (if the deformities are extreme). In either event, the intensity of the reflected beam 132 will be degraded because some of the waves are misdirected. A PSF can be plotted from this intensity data, and then similarly, adjustments can be made to the actuators on the mirror to correct the sensed deformities. If the corrections are appropriate, a subsequent reading will show a greater number of the reflected waves focused onto the proper portion of the infrared imaging sensor 122, resulting in a greater intensity sensed by the infrared imaging sensor 122, and a corresponding increase in the value of the PSF.

These calculations, via voltages sent to the electronic actuators 128, result in adjustments that must be made to the mirror surface 104 in order to return the optics of the mirror system 100 to its original specifications, or to modify the optics of the mirror system 100 to meet new specifications. In this manner, the curvature of the Mylar mirror surface 104 is actively controlled, correcting the optics of the mirror system 100, thereby reducing distortion and improving resolution.

More specifically, the digital voltage signals resulting from these calculations are transmitted from the analog/digital conversion and processor unit 124 to the digital/analog conversion and amplification unit 126 where the digital signal is converted back to an analog signal. The analog signal is amplified and transmitted to the proper electrode(s) 128 via wires 127.

The signal transmitted to the electrode(s) 128 represents a certain voltage level and polarity. This voltage, along with a fixed voltage, is applied to the aluminized Mylar mirror 104, creates an electrostatic force between the electrode(s) 128 and the conductive aluminized Mylar mirror 104. The greater the voltage level, the greater the electrostatic force created between the electrode(s) 128 and the aluminized Mylar mirror 104. The greater the force between the electrode(s) 128 and the aluminized Mylar mirror 104, the greater the distance that the Mylar mirror 104 will move. In a preferred embodiment, the Mylar mirror 104 will move towards the electrode(s) 128 when a positive electric potential is applied to the electrode(s) 128 due to, as illustrated in FIG. 1, the negative potential applied to the Mylar mirror 104. A person of ordinary skill will realize that the same result could be obtained if a negative potential is applied to the electrode(s) 128, and a positive potential is applied to the Mylar mirror surface 104. Furthermore, the same polarity could be applied to both the electrode(s) 128 and the Mylar mirror surface 104 wherein increased voltage levels would cause the mirror surface 104 to move away from the frame 102. The electrostatic force will keep the pertinent portions of the Mylar mirror 104 in position until a different voltage level and/or polarity is transmitted to electrode(s) 128, causing the Mylar mirror 104 to change position accordingly in relation to electrode(s) 128. Further scanning by the infrared light source 120 will confirm whether this portion of the Mylar mirror 104 is properly positioned, or whether repositioning is required.

Algorithms stored in the analog/digital conversion and processor unit 124 controls the infrared light source. The output of the algorithm is a signal transmitted to the infrared light source 120 via wire 123. These signals cause the infrared light source 120 to direct its beam 130 towards different segments of the Mylar mirror 104. A person of ordinary skill will realize that any pattern of scanning the Mylar mirror 104 can be accomplished simply by implementing a different algorithm.

The embodiment of FIG. 2 functions in a manner similar to that of the preferred embodiment of FIG. 1. The infrared light source 220 transmits a laser beam 230, and the infrared imaging sensor 222 detects the reflected laser beam 232. The parallel nature of the reflected beam 232 is detected by the infrared imaging sensor 222. This data is transmitted via wire 221 to the analog/digital conversion and processor unit 224, where as previously explained, well known mathematical analyses of the shapes of the wave fronts result in a calculation of voltage levels and polarity. These voltages are transmitted via wire 225 to the digital/analog conversion and amplification unit 226, where re-conversion to analog and amplification take place.

The amplified analog signal is then transmitted via wires 227 to the pertinent control valves 228. The analog signal either causes a vacuum to be pulled on the chamber 205, or pressurized air to be fed into the chamber 205. If a vacuum is pulled or increased, this will cause the Mylar mirror 204 to be pulled towards the chamber 205 and therefore cause the Mylar mirror 204 to move away from the laser light source 220. In the alternative, if pressurized air is supplied to the chamber 205, this will cause the pressure inside the chamber 205 to increase, thereby pushing the Mylar mirror 204 away from the chamber 205 and towards the laser light source 220. Similar to the preferred embodiment disclosed in FIG. 1, further readings of reflected beams 232 are taken by the infrared imaging sensor 222 to determine if the adjustments to the Mylar mirror surface 104 corrected the optics of the mirror to a satisfactory level.

After the Mylar mirror 104 is properly adjusted, the vacuum will be pulled or the pressure applied at a constant level until the scanning infrared light source 220 determines from future reflected beams 232 that adjustments must be made to the vacuum or pressure. And as previously explained in connection with the embodiment of the present invention disclosed in FIG. 1, an algorithm stored in the analog/digital conversion and processor unit 224 controls the pattern in which the light source 220 scans the Mylar mirror 204.

The function of a single electrostatic actuator and pneumatic vacuum/pressure chamber has just been described. However, in a preferred embodiment, there are tens, if not hundreds of actuators or chambers on a Mylar mirror 104, depending upon the size of the mirror. Indeed, for a large space-based astronomical mirror, there may very well be thousands or tens of thousands of actuators and/or chambers. Moreover, while a single correction cycle for one actuator has been described, in a preferred embodiment, the infrared light source 120/220 scans the Mylar surface of the mirror 104/204 in a repetitive pattern in order to actively and continuously survey the position of the surface of the Mylar mirror 104/204 along the entire Mylar mirror surface 104/204. Finally, while the mirror systems 100 and 200 have been described as separate embodiments, combinations of electrode(s) 128 and vacuum/pressure chambers 205 could be employed on a single mirror system.

As will be apparent to one of ordinary skill in the art upon review of this disclosure, numerous additional modifications and variations of the present invention are possible in light of the above teachings. It is therefore to be understood that within the scope of the appended claims the invention may be practiced otherwise than as specifically described herein.

What is claimed is:

1. A mirror comprising:

a frame;

a reflecting surface connected to said frame;

an infrared light source, said infrared light source transmitting an infrared beam towards said reflecting surface, said reflecting surface reflecting said infrared beam;

an imaging sensor to detect said reflected infrared beam;

an analog/digital conversion and processor unit electrically coupled to said imaging sensor;

a digital/analog conversion and amplification unit electrically coupled to said analog/digital conversion and processor unit; and one or more actuators attached to said frame and electrically coupled to said digital/analog conversion and amplification unit.

2. The mirror according to claim 1, wherein said analog/digital conversion and processor unit is electrically coupled to said infrared light source.

3. The mirror according to claim 1, wherein said reflecting surface comprises a thin filmed plastic.

4. The mirror according to claim 3, wherein said thin filmed plastic comprises Mylar.

5. The mirror according to claim 1, wherein said reflecting surface comprises glass.

6. The mirror according to claim 1, wherein said reflecting surface comprises quartz.

7. The mirror according to claim 3, wherein said thin filmed plastic surface is aluminized.

8. The mirror according to claim 1, wherein said infrared light source is a laser.

9. The mirror according to claim 1, wherein said imaging sensor is a charged coupled device.

10. The mirror according to claim 2, wherein said analog/digital conversion and processor unit comprises an algorithm for controlling said infrared light source.

11. The mirror according to claim 1, further comprising a foam coffer dam disposed between said frame and said reflecting surface, wherein said frame, said reflecting surface and said foam coffer dam form a chamber.

12. The mirror according to claim 11, wherein said actuator comprises a control valve connected to said digital/analog conversion and amplification unit, said control valve connected to a vacuum source.

13. The mirror according to claim 12, wherein said control valve is connected to a pressurized air source.

14. The mirror according to claim 1, wherein said actuator comprises an electrode.

* * * * *